3,451,102
CATALYST EXTRUSION HEADER AND PROCESS OF EXTRUSION

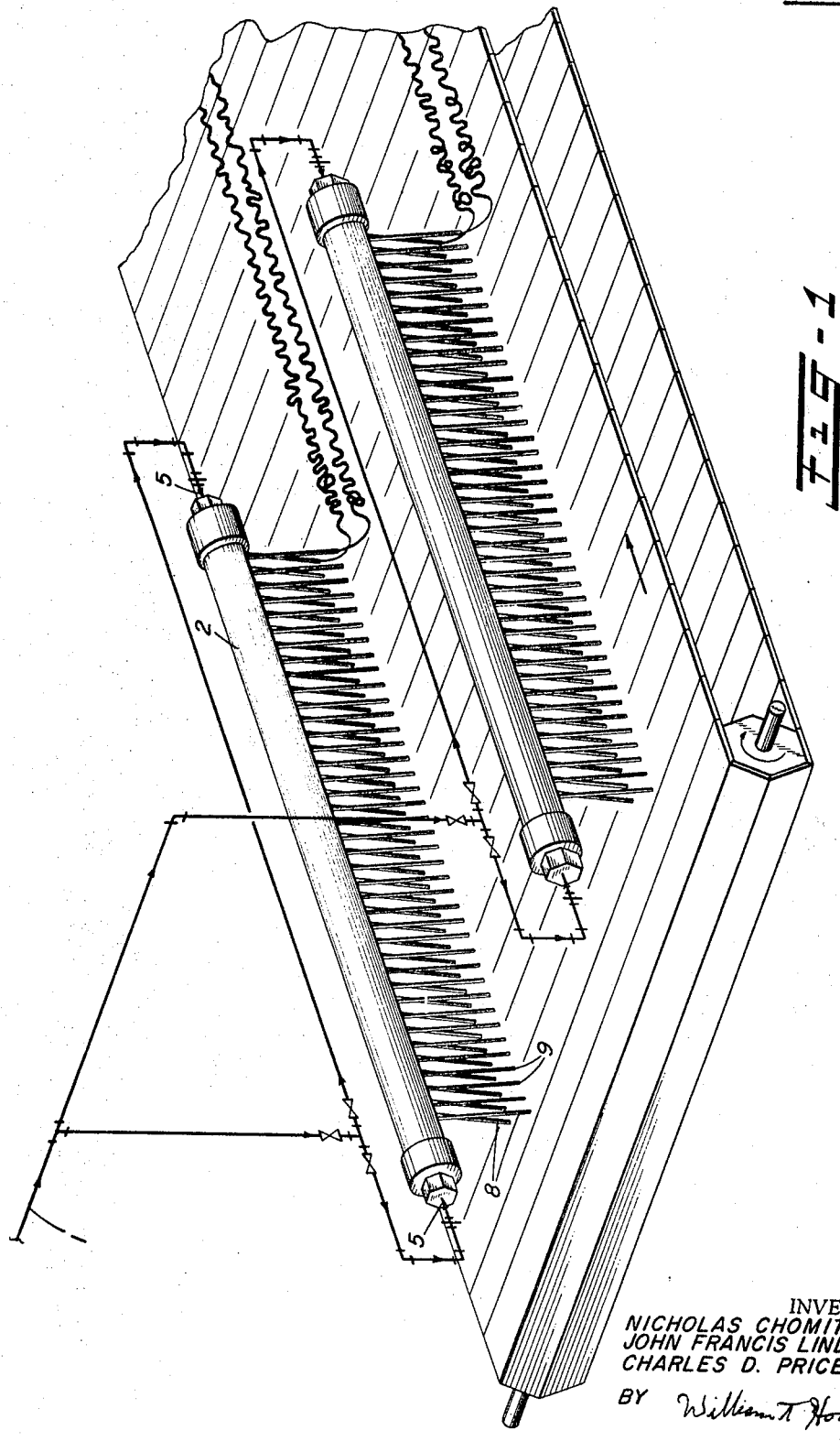

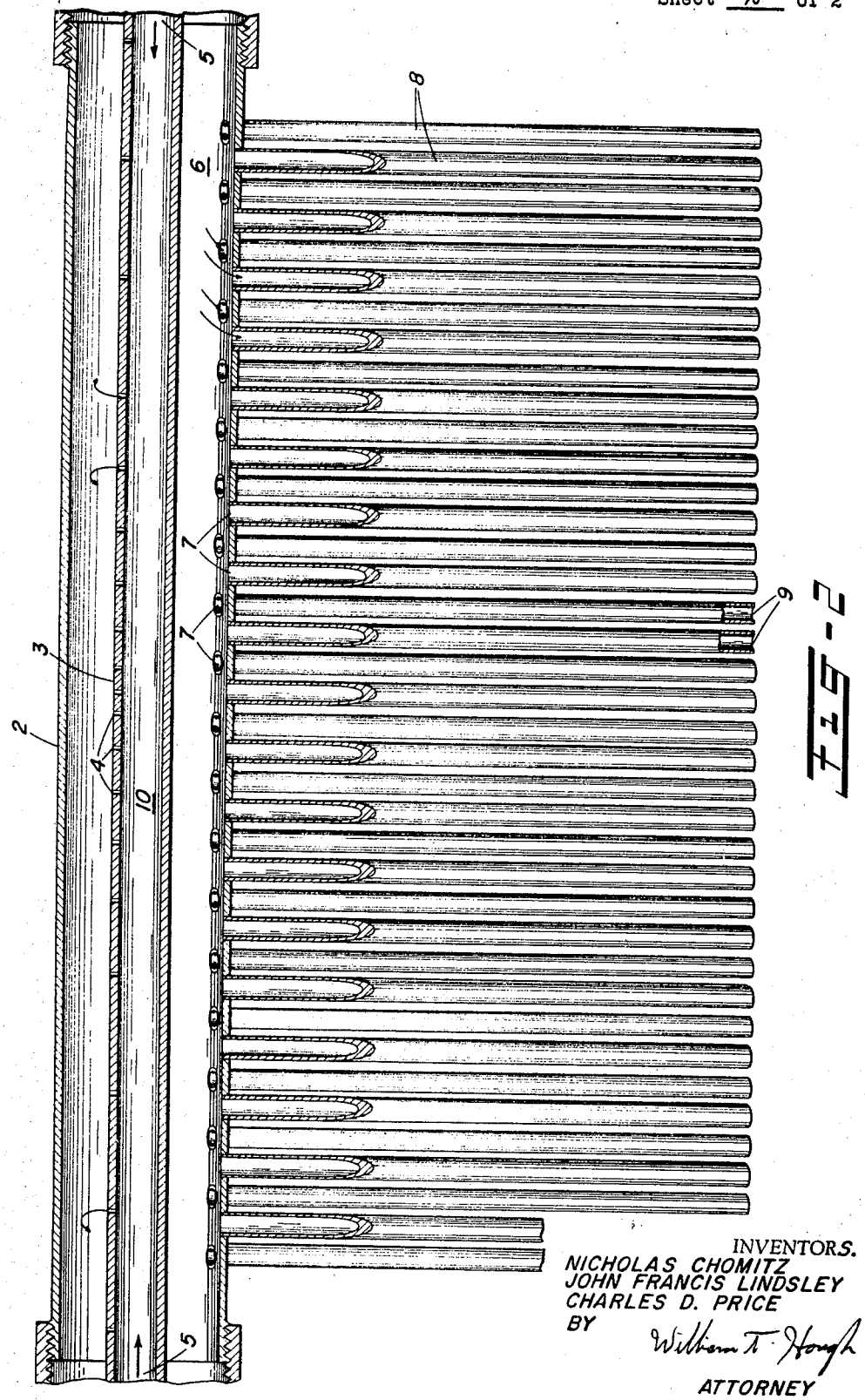

Nicholas Chomitz, Michigan City, Ind., John Francis Lindsley, Glenbrook, Conn., and Charles D. Price, Fort Worth, Tex., assignors to American Cyanamid Company, Stamford, Conn., a corporation of Maine
Filed Nov. 10, 1965, Ser. No. 507,099
Int. Cl. B29f 3/01; A21c 11/16; B28b 3/20
U.S. Cl. 18—12                                    6 Claims

ABSTRACT OF THE DISCLOSURE

An extrusion header where the extrudate is extruded at a uniform pressure. The header consists of an outer tube closed at both ends and an inner tube extending through the ends of the outer tube with linear perforations extending from end to end of both tubes, but the perforations of the outer tube are orientated at 120 to 180° from the perforations of the inner tube. Further, the perforations are irregularly spaced such that for any extrudate, starting from the outer end of tubes and working toward the center; the spacing of the perforations will be a function of the pressure drop for the given extrudate and at the center of the tube the pressure is nearly zero. Connected to the outer perforations, one extrusion tube is sealed to each perforation.

---

This invention relates to an extrusion header. More particularly, this invention relates to an extrusion header for the uniform extrusion of an extrusion feed.

Although the extrusion header may be employed to obtain more uniform extrusion of any extrudable material such as spaghetti, plastics, etc., the extrusion header is particularly designed to overcome the problems associated with the extrusion of silica-alumina hydrogels, as well as other extrudates such as hydrous oxides, hydrogels in general, and other catalyst forming materials.

In the extrusion of silica-alumina hydrogels, typically of the type described in the co-pending application, Ser. No. 344,842, filed Feb. 14, 1964, and now Patent No. 3,390,100 non-uniform flow through the extrusion header typically is encountered as a major problem resulting in extrudates of non-uniform properties and characteristics.

When the extrusion feed is made sufficiently viscous to properly extrude into a formed extrudate having the desired resiliency, such an extension feed does not extrude at a uniform rate through the various extrusion tubes along the extrusion header of the typical prior art extrusion headers.

When the rate of extrusion varies among the extrusion tubes of an extrusion header, quality of the extrudate is adversely affected because of such factors as too great an extrusion rate through some extrusion tubes, with a concurrent too small an extrusion rate through other extrusion tubes. The density of some extrudates may be greater than that of other extrudates. The extrusion tubes having the lesser rate of flow may become clogged. The extrusion tubes having a lesser rate of flow may produce an extrudate which becomes stretched into a smaller strand as the collecting device moves at a steady rate under all of the extrusion tubes. In the vicinity of the extrusion tubes having a lower rate of extrusion, degeneration of the extrusion feed may take place, whereby when extruded, the extrudate is of inferior quality. Many other such typical defects may readily occur with the employment of the typical prior art extrusion header. Such inferior quality extrudates cannot be tolerated in commercial production.

The typical conventional extrusion disk in use, prior to the present invention, was a multi-orificed circular disk. This disk gives variable (non-uniform) extrusion. The number of orifices are limited to the disk diameter, and variation in definite spacings of the orifices cause extrudate adhesion and off-grade production formation. This design is not practical from a production standpoint.

In an effort to overcome the problems encountered by the use of conventional headers, new headers were designed. For example, a straight six-foot pipe having closed ends was employed. Orifices along the pipe were drilled, and a feed inlet was drilled at the mid-point between the two ends, resulting in a header having the appearance of an inverted T, and referred to as a T-bar header. Extrudates were variable and flow was selective at the center of the T, near the feed inlet. The extrudate strand velocities were not controllable. Generally, extrusion was poor with little yield of actual extrudates.

Subsequently, other modifications were attempted, such as including two (2) feed entries into the T-bar header, and still later, including four (4) feed entries. Although improvement was observed in extrusion, the linear strand velocities were not controllable, and selective extrusion occurred at each of the T feed-line entries.

In a further effort, a radically different design was attempted. A triangular pie-shaped or fish-tail-designed extrusion header was made, converging from a circular pipe to a smaller narrow extrusion face containing multiple holes. Uniform flow deteriorated and selective flow resulted.

Subsequently, experimentation proceeded which resulted in the preferred embodiment of this invention, having opposing feed inlets, etc., as described below. From the above discussion of conventional headers and their accompanying problems, and from the disclosed attempts which failed to satisfactorily overcome the problems discussed, it is apparent that the solution of these problems is not a simple matter, and that the problems are of real significance.

It is an object of this invention to obtain an extrusion header through which extrudate of a substantially uniform quality may be extruded at a substantially uniform rate through each of a series of extrusion tubes extending from and a part of the extrusion header.

Another object of this invention is to obtain a process for the extrusion of an extrusion feed of a uniform flow and quality, and a controllable flow and strand velocities.

Other objects become apparent from the above and following disclosure, and the figure illustrates a typical extrusion header design within the scope of this invention.

The objects of this invention are obtained, as illustrated in FIGURES 1 and 2, by passing an extrusion feed (1), typically from a homogenizer through an extrusion header having (a) a substantially cylindrical outer tube (2) closed at both ends, (b) a substantially cylindrical inner tube (3) having openings (5) at both ends, mounted inside the outer tube, and extending through both ends of the outer tube, (c) a first substantially linear series of perforations (4), said first series extending between the ends of said outer tube in the wall of said inner tube, (d) a second series of orifice outlets (7), said second series extending between the ends of said outer tube in the wall of said outer tube and said orifice outlets each being located at an orientation at from about 120° to about 180° away from the perforations of said inner tube, (e) a series of extrusion tubes (8) of which, for each orifice outlet one extrusion tube is intimately sealed into the orifice outlet by a means whereby a flow path extends from inside said outer tube through said extrusion tube and out of the open end (9) of said extrusion tube, (f) the spacing distance between said perforations of said first series decreasing at points nearer the mid-point between the ends of said outer tube such that pressure within said outer tube is substantially uniform at substantially all points adjacent to each orifice outlet of said series of orifice outlets, when an extrusion feed is being fed under pressure into said openings at both ends of said inner tube under at least substantially minimum necessary and sufficient pressure to cause flow through each of said perforations. It is not critical that no more than minimal pressure be employed, since greater pressure may also be employed if preferred for any reason.

In the preferred embodiment of the extrusion header, the number of degrees are from about 165° to about 180°. By having the orifice outlets at an orientation angle approximately 175° (on both sides of the outer tube), away from the inner tube perforations, the pressure value in the annular spaces over the orifice outlets for the respective extrusion tubes is more uniformly equal. The heart of the invention lies in this orientation, in combination with an arrangement of perforations in the inner tube in a manner whereby the spacing between the respective perforations decreases as the perforations get closer to the mid-point between the two ends of the closed outer tube. The spacing and the diameter of the respective perforations are controlled in a manner whereby the pressure at points closer to the mid-point within the inner tube decreases, possibly approaching zero, at the mid-point.

The exact spacing, the number of total perforations, the rate of increase in number toward the mid-point in the number of perforations per given length of the inner tube, and the diameter of the respective perforations, for example, will vary for the extrusion header, depending upon the particular material to be ultimately extruded through the extrusion header, and may be easily determined for the particular extrusion feed to be employed. Some extrusion feeds are of a consistency which requires greater pressure than other extrusion feeds, and which require different consistency. Also, some types of extrusion feeds are more or less viscous than others. In all cases, however, the desire for uniform rate of extrusion and the uniform consistency and uniform quality of the extrudate remains. Therefore, the particular dimensions discussed above, may be varied to conform to the specific extrusion feed to be employed. In all cases, however, the basic structure of the extrusion header of this invention remains constant to obtain a uniform rate of extrusion and a uniform quality extrusion product.

For purposes of extrusion of silica-alumina hydrogel, the following extrusion header critical dimensions of (a) granular space (10) between the inner tube and the outer tube, (b) spacings between respective perforations of the inner tube, and (c) diameter of respective inner tube perforations are necessary to obtain the uniform rate of extrusion and uniform quality extrudate.

Of greatest importance is the diameter of the inner tube, in its relation to the diameter of the outer tube, and the diameter of the respective perforations, together with the spacing of the perforations from one another.

Regarding the annular space, uniformity in extrusion results from the use of the inner-distributor tube. Therefore, if the internal tube diameter is decreased, a situation would be approached wherein the "no" distributor-tube conditions would exist, and non-uniformity of extrusion would be expected. As the inner-distributor tube-diameter is increased beyond certain optimal and critical limits, distribution within the inner-distributor tube itself would become a greater problem, eventually making necessary another inner-distributor tube within the existing inner-distributor; this would introduce additional problems and variables as well as adding to the structural complexity of the header.

The inner tube may vary from about 1/8 inch to about 3.5 inches, and the diameter of the outer tube may vary from about 0.5 inch to about 4 inches, with the limiting provision that the difference between the diameter of the inner tube and the diameter of the outer tube must be at least about 1/8 inch and not more than about 2 inches. The ratio of diameters of the ends of the outer cylindrical tube to the inner cylindrical tube is less than about 9:1 and more than about 1.04:1. Also, the diameter of the outer tube is at least about 0.5 inch.

The diameter of the respective perforations in the inner cylindrical tube may vary; i.e., all perforations do not necessarily have the same diameter. The desired (preferred) diameter of a particular perforation is dependent upon such factors as the nearness to one end of the outer tube, the magnitude of the spacing between the particular perforation and other adjacent perforations, the nearness to the mid-point on the inner tube between the two ends of the outer tube, the extrusion-feed pressure-drop desired at the particular point within the inner cylindrical tube, whether feed is being injected into merely one end or alternatively into both ends of the inner tube, etc.

If the feed is introduced into both ends of the inner tube, as in the critical-preferred embodiment, the spacings are controlled (designed) at determinable distances and perforations' diameters are controlled (designed) to respective dimensions whereby the pressure drops to about zero (0) at the mid-point between the feed inlets. For purposes of the extrusion of silica-alumina hydrogel, the diameter of perforations normally may range from about 1/64 to about 0.2 inch in diameter, depending upon the spacing distances between perforations. For the optimum results of the preferred embodiment, the preferred and critical range is between about 1/20 inch (0.05) and about 1/13 inch (0.08), preferably, about 1/16 inch.

For purposes of an extrusion header for use in the extrusion of silica-alumina hydrogel, the hole diameter in the respective extrusion tubes extending from the respective orifice outlets of the outer cylindrical tube is less than about 0.55 inch. The diameter of the respective extrusion tubes may range from a size merely sufficiently large enough for extrusion to take place up to about 0.5 inch diameter. The diameter may be at least as small 0.01 inch. The critical diameter for optimum results ranges between about 0.1 inch and about 0.2 inch, preferably about 5/32 inch.

Although the length of the extrusion header, i.e., the length of the outer cylindrical tube, may vary widely depending upon the intended ultimate use intended for the header, for purposes of extrusion of silica-alumina hydrogel, the length of the cylindrical outer tube ranges from about 2 feet to about 10 feet in length, and similarly the lenth of the individual extrusion tubes extending from the outer tube range from about 3 inches up to 12 inches or more.

As disclosed above, the orientation and the spacing of the perforations in the inner cylindrical tube and of the orifice outlets in the outer cylindrical tube are critical to this invention.

Also, as disclosed above, the number of perforations in the inner cylindrical tube must increase per unit of length when moving in a direction toward the mid-point between the ends of the outer tube, having a feed point at each end or when moving toward the closed end of an inner tube having a single feed point. If the total number of perforations extending over the entire length of the inner cylindrical tube be divided by the entire length of the inner cylindrical tube, between the end walls of the outer cylindrical tube, the overall average number of perforations per foot length of inner cylindrical tube ranges from about one perforation to about two perforations per foot length, provided that, for example, one foot may contain only one perforation and the next addition foot near the mid-point may contain as many as three perforations per foot.

As to the number of orifice outlets from which extrusion tubes extend, as stated about, the spacing between the orifice outlets is preferably uniform and accordingly the number of orifice outlets per unit length is uniform and may vary from about 15 orifice outlets per foot length of the outer tube to about 30 orifice outlets per foot length of the outer tube. In the preferred embodiment, the orifice outlets are staggered on opposite orientation-sides of the outer tube.

In the preferred embodiment of this invention, with about nine perforations per 4 or per 6 foot lengths of inner cylindrical tube, with about 100 orifice outlets per 4 or per 6 foot lengths of outer cylindrical tube are employed. In another embodiment, about 6 perforations per 4 feet of inner cylindrical tube with about 93 orifice outlets per 4 feet of cylindrical outer tube are employed.

Except as discussed above, the orientation of the extrusion tubes to one another is not critical to this invention except insofar as variations in shape of the extrusion tube can introduce additional pressure variations in the extrusion process. Therefore, in the preferred embodiment, the extrusion tubes are substantially straight tubes. The only requirement as to spacing is that the distance be sufficient between tubes to avoid twining of the extrudates formed therefrom.

As discussed above, pressure within the inner cylindrical tube decreases at points near the mid-point of the inner cylindrical tube, in the extrusion header of this invention. For purposes of extrusion of silica-alumina hydrogel, inlet pressures normally average between 300 and 500 pounds per square inch and may extend up to as high as 1,000 pounds per square inch.

In the preferred extrusion header of this invention, the number of perforations, the orientation, the spacing, and the diameter of the perforations are such that in the inner cylindrical tube at a point approximately half-way between the closed ends of the outer cylindrical tube, the pressure gradient between opposing feed-points has decreased sufficiently that the pressure approaches zero pressure while maintaining at least a minimal flow through each of the perforations in the wall of the inner cylindrical tube.

It is within the scope of this invention to employ equivalence of the structures described herein, and to make such modifications as would be obvious to the ordinary artisan within the spirit of this invention. Accordingly, the above disclosure is not intended to limit the scope of this invention except insofar as the appended claims are limited.

We claim:

1. An extrusion header comprising (1) a substantially cylindrical outer tube closed at both ends, (2) a substantially cylindrical inner tube mounted inside said outer tube and extending through at least one end of said outer tube, said inner tube having an inlet feed-opening where it extends through said outer tube, (3) a first substantially linear series of perforations in the wall of said inner tube, said first series extending between the ends of said inner tube inside of said outer tube, (4) a second series of orifice outlets in the wall of said outer tube, said second series extending along the wall of said outer tube at an orientation at from about 120° to 180° away from the perforations in said inner tube, (5) a series of extrusion tubes of which, for each orifice outlet, one extrusion tube is intimately sealed into the orifice outlet by a means whereby a flow path extends from inside said outer tube through said extrusion tube and out of the open end of said extrusion tube, (6) the spacing distance between said perforations of said first series decreasing as the distance from said end opening in said inner tube increases such that pressure at substantially all points adjacent to each of said orifice outlets within said outer tube is substantially uniform when an extrusion feed is being fed under pressure into said end opening of said inner tube.

2. An extrusion header according to claim 1, in which said inner tube has inlet feed-openings at opposite ends of said inner tube, and in which the spacing distance between said perforations of said first series decreases at points nearer the mid-point between the inlet-feed openings at opposite ends of said inner tube such that pressure within said outer tube is substantially uniform at substantially all points adjacent to each orifice outlet of said series of orifice outlets, when an extrusion feed is being fed under pressure into said inlet-feed openings of said inner tube under at least substantially minimum necessary and sufficient pressure to cause flow through each of said perforations.

3. An extrusion header according to claim 2, in which the spacing between said orifice outlets of said second series is substantially uniform, in which said perforations each range from about 1/64 inch to about 0.2 inch in diameter, in which the ratios of diameters of the ends of said outer sylindrical tube to said inner cylindrical tube is less than about 9:1, and more than about 1.04:1 in which the difference in said diameters is at least about 1/8 inch, in which the diameter of said outer tube is at least 0.5 inch, in which the diameter of said inner tube ranges from about 1/8 inch to about 3.5 inches in which the diameter of said outer tube ranges from about 1/2 inch to about 4 inches, in which said perforations of said first series range in overall average number from about one perforation per foot length of said inner tube to two perforations per foot length of said inner tube, and in which said orifice outlets of said second series range in uniform number from about fifteen orifice outlets per foot length of said outer tube to about thirty orifice outlets per foot length of said outer tube.

4. An extrusion header according to claim 3, in which said openings in each of said extrusion tubes are each less than about 0.55 inch in diameter and in which said perforations of said first series are each less than about 0.15 inch in diameter.

5. An extrusion header according to claim 4, in which said perforations of said first series range in overall average number from about one perforation per foot length of said inner tube to two perforations per foot length of said inner tube, in which said orifice outlets of said second series range in uniform number from about fifteen orifice outlets per foot length of said outer tube to about thirty orifice outlets per foot length of said outer tube, in which said pressure of said extrusion header at said mid-point approaches substantially zero and in which said orifice outlets are staggered.

6. An extrusion header according to claim 3, in which the length of said cylindrical outer tube ranges from about 2 feet to about 10 feet, in which said extrusion tube length is at least about 3 inches, and in which said orientation is from about 165° to about 180°.

References Cited

UNITED STATES PATENTS

| 2,197,988 | 4/1940 | Tanzi | 107—14 |
| 3,155,540 | 11/1964 | Loeffler et al. | 18—120 |

FOREIGN PATENTS

| 380,579 | 10/1907 | France. |
| 466,026 | 10/1951 | Italy. |

WILBUR L. McBAY, Primary Examiner.

U.S. Cl. X.R.

107—14; 264—176